(12) United States Patent
Hayoun

(10) Patent No.: US 12,135,492 B2
(45) Date of Patent: Nov. 5, 2024

(54) BOX FOR THE REMOTE DISPLAY OF AN OBJECT

(71) Applicant: Denis Hayoun, Geneva (CH)

(72) Inventor: Denis Hayoun, Geneva (CH)

(73) Assignee: THE SWISS PHYGITAL COMPANY SA, Geneva (CH)

( * ) Notice: Subject to any disclaimer, the term of this patent is extended or adjusted under 35 U.S.C. 154(b) by 0 days.

(21) Appl. No.: 18/256,409

(22) PCT Filed: Oct. 28, 2021

(86) PCT No.: PCT/EP2021/080010
§ 371 (c)(1),
(2) Date: Jun. 7, 2023

(87) PCT Pub. No.: WO2022/128225
PCT Pub. Date: Jun. 23, 2022

(65) Prior Publication Data
US 2024/0069415 A1    Feb. 29, 2024

(30) Foreign Application Priority Data

Dec. 14, 2020    (WO) ................. PCT/EP2020/086032

(51) Int. Cl.
G03B 15/02            (2021.01)
(52) U.S. Cl.
CPC .................................... *G03B 15/02* (2013.01)
(58) Field of Classification Search
CPC ..................................................... G03B 15/02
See application file for complete search history.

(56) References Cited

U.S. PATENT DOCUMENTS

| | | | | |
|---|---|---|---|---|
| 4,677,473 A * | 6/1987 | Okamoto | ........... | G01N 21/8806 356/613 |
| 5,461,417 A * | 10/1995 | White | .................... | H04N 23/74 348/125 |
| 5,644,140 A * | 7/1997 | Biedermann | ...... | G01N 21/9501 250/559.08 |
| 6,598,994 B1 * | 7/2003 | Tait | ........................ | G01B 11/00 362/249.05 |

(Continued)

FOREIGN PATENT DOCUMENTS

| CN | 203658714 U | 6/2014 |
|---|---|---|
| CN | 208334869 U | 1/2019 |

(Continued)

OTHER PUBLICATIONS

International Search Report for PCT/EP2021/080010 mailed Feb. 9, 2022, 11 pages.

(Continued)

*Primary Examiner* — Arman B Fallahkhair
(74) *Attorney, Agent, or Firm* — NIXON & VANDERHYE

(57) ABSTRACT

Disclosed is a lighting box for taking an exposure of an object, having a casing defining a closed housing for an object to be examined and including a bottom and a cover, a lighting system including a plurality of light sources disposed around the casing, the casing acting as a light guide over its entire extent in order to ensure substantially uniform lighting of the housing.

20 Claims, 5 Drawing Sheets

(56) References Cited

U.S. PATENT DOCUMENTS

| | | | |
|---|---|---|---|
| 7,041,997 B2* | 5/2006 | Paradis | G01N 21/8806 |
| | | | 356/237.1 |
| 7,724,385 B2* | 5/2010 | Foth | G07B 17/00661 |
| | | | 358/1.14 |
| 7,978,970 B2* | 7/2011 | Pastore | G03B 15/06 |
| | | | 348/370 |
| 8,462,206 B1 | 6/2013 | Mcguire et al. | |
| 9,467,609 B2* | 10/2016 | White | H04N 23/56 |
| 2003/0184740 A1* | 10/2003 | Paradis | G01N 21/9036 |
| | | | 356/237.1 |
| 2003/0193800 A1 | 10/2003 | Lai et al. | |
| 2005/0135657 A1 | 6/2005 | Foth et al. | |

FOREIGN PATENT DOCUMENTS

| | | |
|---|---|---|
| FR | 3033415 A1 | 9/2016 |
| FR | 3084756 A1 | 2/2020 |
| WO | 2015132785 A1 | 9/2015 |

OTHER PUBLICATIONS

Written Opinion of the ISA for PCT/EP2021/080010 mailed Feb. 9, 2022, 7 pages.

* cited by examiner

Fig. 9

BOX FOR THE REMOTE DISPLAY OF AN OBJECT

This application is the U.S. national phase of International Application No. PCT/EP2021/080010 filed Oct. 28, 2021 which designated the U.S. and claims priority to EP PCT/EP2020/086032 filed Dec. 14, 2020, the entire contents of each of which are hereby incorporated by reference.

TECHNICAL FIELD

The present invention relates to a box for the remote display of an object by means of a still camera or a video camera, comprising
- an envelope defining a substantially closed housing for an object to be examined and comprising a bottom and a cover,
- an illumination system comprising a plurality of light sources located around the envelope,
- the cover being made of a material transmitting at least some of the light emitted by the light sources toward the interior of the housing and having an internal surface for diffusing the light transmitted to the interior of the housing, the cover comprising a hole intended to be obstructed by the lens of a still camera or a video camera located outside the envelope to shoot the object, as well as at least one first opening, at a distance from the hole and defining a passage through the cover, to enable an operator to introduce an object to be examined into the housing, to extract it therefrom and to manipulate it therein.

PRIOR ART

Similar devices are known from the prior art, in particular with the aim of proposing easily transportable photographic studios.

Thus, for example, patent application US 2003/0193800 A1 describes a plurality of embodiments of an illumination box enabling uniform illumination of an object to be photographed located inside the box. FIG. 1 of the above document depicts the prior art corresponding to the invention concerned, namely a box having a large opening at the front through which an object to be examined can be introduced and through which shooting can be carried out. Obviously, with a box of this kind, the dimensions and the location of the front opening degrade the quality of the illumination obtained. Thus the above document proposes in particular a box, depicted in FIGS. 6 and 7, including a base surmounted by a parallelepipedal lid. A plurality of light sources are arranged vertically around a parallelepipedal central housing delimited by a sheet of light-diffusing material. A device for shooting an object is arranged above the housing, outside the lid. Access to the interior of the housing is not very clear in this embodiment but in another embodiment (FIG. 5) this document provides for the lid to be provided with a lateral door offering access to the housing. It may be assumed that in the embodiment from FIGS. 6 and 7 the plate to which the imaging device is fixed is removable, given that the arrangement of the light sources does not allow the provision of a lateral door.

In all cases, the boxes described in the above document do not enable either manipulation of the object to be examined and the simultaneous employment of sufficiently uniform illumination of that object to enable remote display of that object with good viewing conditions for a remotely located interlocutor (FIGS. 3 to 5) or simultaneous manipulation and shooting of the object to be examined (FIGS. 6 and 7). Moreover, not only are the light sources not arranged in a sufficiently regular manner around the housing, but also a plurality of dark zones are inevitable and could be detected in the shots, depending on the nature of the object to be examined, in particular if the latter includes at least one reflecting surface as is for example the case of a watch with its crystal and sometimes its case. In particular, the bottom and the door or doors providing access to the housing constitute dark zones of this kind, so any faces of the object to be examined oriented in the direction of the bottom or the top of the box will not be illuminated as well as its lateral faces.

Patent application US 2003/0184740 A1 discloses a system for checking the quality of tableware, such as plates for example, having substantially the features stated above. That system includes a large opaque envelope enclosing an illumination device and a still camera. The latter is arranged vertically above a predefined location in which the tableware items must be positioned to check the quality thereof. The envelope comprises an entry and an exit defining between them a tunnel along which moves a conveyor belt on which the tableware to be checked is placed. Mechanisms may be provided inside the envelope for possible manipulation of the tableware, for example for turning them over.

Obviously the above system is not portable but is rather intended to be integrated into an industrial production line, having specific features enabling optimization of the flow of the objects to be checked and maximum automation of the checking procedure. Human intervention in that procedure makes no sense given that the objective of this system is to check large series of identical (or quasi-identical) objects one after the other in the most efficient and fastest manner possible.

Thus there still exists the need to be able to employ a transportable box for the remote display of an object enabling uniform illumination of the object to be examined with optimum quality, so as to enable a remotely located interlocutor to assess the qualities of the object to a degree matching as closely as possible a direct examination of that object.

DISCLOSURE OF THE INVENTION

A main aim of the present invention is to propose a box of different construction to that of the boxes already known from the prior art enabling a remotely-located interlocutor to enjoy as faithful as possible conditions for viewing the object.

To this end the present invention more particularly relates to a box of the type referred to above characterized
- in that its bottom is also made of a material transmitting at least some of the light emitted by the light sources toward the interior of the housing and having an internal surface for diffusing the light transmitted to the interior of the housing,
- in that the envelope serves as a light guide over the entirety of its extent to produce substantially homogeneous illumination of the housing, in that it has dimensions such that in a service position, in which the operator faces it, the operator is in a position to place one hand substantially at the centre of the housing by inserting one arm through the first opening, and
- in that the hole for the lens of the still camera or the video camera and the first opening are so positioned that in the service position the hole is located substantially between the eyes of the operator and the housing.

Thanks to these features, the light emitted by the light sources propagates throughout the envelope and limits the appearance of dark zones that would be detectable when shooting the object to be examined, the light therefore reaching the object from all directions. Moreover, although a direct view of the object to be examined when it is in the housing is not possible for the operator, because of the structure of the envelope and of the illumination system, the relative positions of the lens of the still camera or the video camera and the eyes of the operator enable images of the object to be examined to be captured that substantially correspond to a direct view. The operator can therefore manipulate the object in the box, in particular to change its orientation, with a sensation very close to that of manipulation of the object outside the box with a direct view of it. Likewise, a remotely-located interlocutor to whom the object would be displayed using the box according to the invention could view that object in a very faithful manner, that is to say by virtually having the impression of having the object in their own hands. Of course, communication between the operator and the remotely-located interlocutor enables the latter to request of the operator any change of view or of orientation of the object as a function of their wishes or needs.

In a variant embodiment it is possible for the interface between the bottom and the cover to be such that some of the light emitted by the light sources can pass from the bottom to the cover and vice-versa.

Moreover, it may be particularly advantageous to provide for the cover to comprise at least one second opening defining an additional passage through the cover enabling the operator to introduce the object to be examined into the housing, to extract it therefrom and to manipulate it therein, the first and second openings being positioned the one relative to the other so that the operator can simultaneously insert therein both their arms to be able to manipulate the object to be examined in the service position.

In this case, it may, in particular as a function of the dimensions of the box, be preferable to provide for the hole and the first and second openings to be arranged on the same side of a transverse plane substantially perpendicular to the bottom and containing the centre of the box. Thus if the operator takes up a position relative to the box corresponding to the service position, that is to say facing the latter with the first and second openings oriented toward them and located substantially symmetrically relative to a transverse plane passing through the centre of the box and between the eyes of the operator, access to the housing is obtained symmetrically through the two openings, which facilitates the manipulation of the object in the housing.

Generally speaking, it may be advantageous for there to be provision for the cover to have a curved general shape with no sharp edges.

Thus the entirety of the internal surface of the envelope appears uniform when it is observed from the inside of the housing, with the sole exceptions of the hole in the cover enabling shooting from outside the envelope and the openings providing access to the housing for the operator.

Generally speaking, there may be provision for the box according to the invention to comprise a protective shell located around the cover at a sufficient distance therefrom to define a space in which are arranged at least some of the light sources and a video camera.

Alternatively, there may be provision for the box according to the invention to comprise a protective shell located around the cover at a sufficient distance therefrom to define a space in which are located at least some of the light sources, the shell featuring a window substantially aligned with the hole in the cover, through which shooting may be effected.

In this case, there may advantageously be provision for the shell to carry a support for a still camera, a smartphone, a tablet or a video camera.

Generally speaking, there may be provision for the box to include a device for controlling the light sources enabling adjustment of the properties of the light emitted thereby, in particular its intensity and its temperature. The light sources may preferably be controlled individually and/or in groups.

There may also be provision for the box to include a remote-control device for a still camera, a smartphone, a tablet or a video camera, in particular for triggering shooting.

Generally speaking, there may advantageously be provision for the box according to the invention to comprise a screen for displaying images captured by the still camera or the video camera arranged on the protective shell.

In accordance with an advantageous variant embodiment, the display screen may be the screen of a tablet fastened to the protective shell by means of an appropriate support. In this case, there may equally be provision for the appropriate support to be arranged in such a manner as to allow pivoting of the tablet relative to the protective shell between an active, deployed position and an inactive position folded towards the protective shell.

Moreover, there may further be provision for the tablet to comprise at least one additional video camera to enable a videoconference to be held between the operator and a remotely-located interlocutor.

Generally speaking, there may preferably be provision for the box to comprise an electronic connection device adapted to enable the transmission of the images of the object captured by the still camera or the video camera to a remotely-located interlocutor. When the box includes a tablet, there may advantageously be provision for the electronic connection device to be adapted to transmit images of the object to the tablet, the latter including a device for connecting it to a communication network.

BRIEF DESCRIPTION OF THE DRAWINGS

Other features and advantages of the present invention will become more clearly apparent on reading the following detailed description of a preferred embodiment of the invention given with reference to the appended drawings provided by way of non-limiting example and in which:

FIGS. 7, 8 and 9 represent views respectively similar to those of FIGS. 1, 2 and 4 in which an operator has been schematically depicted.

EMBODIMENT(S) OF THE INVENTION

Figure 1:
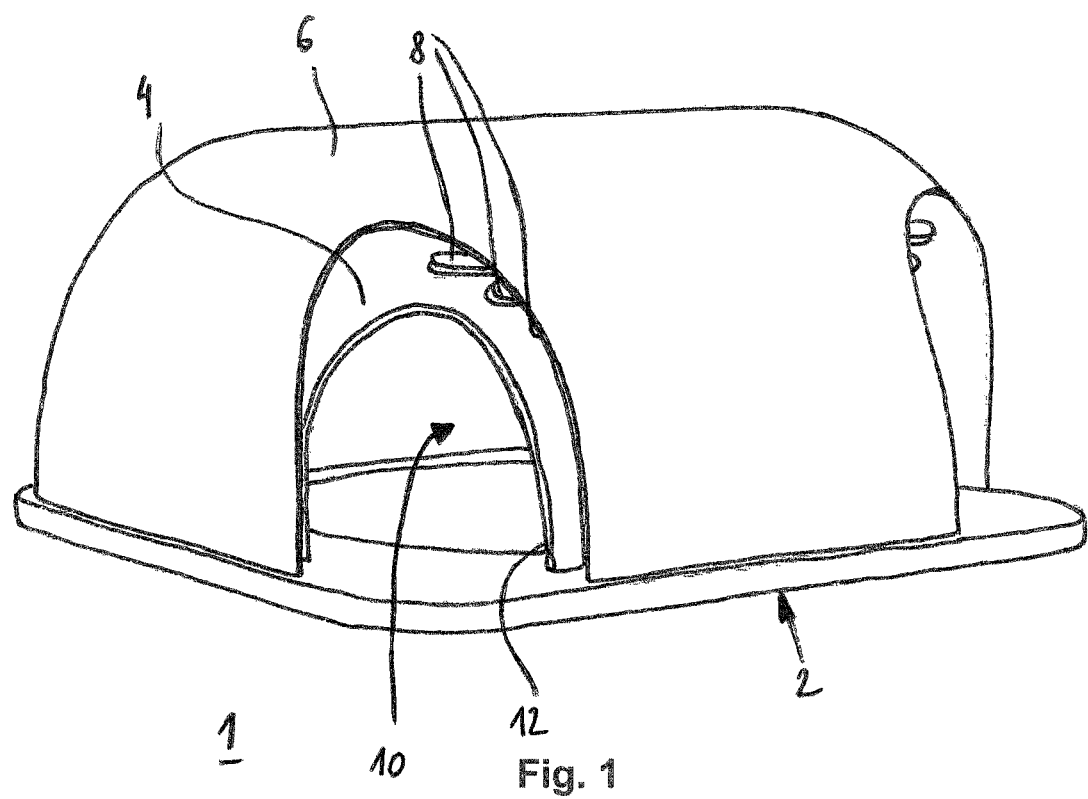
FIG. 1 represents a simplified perspective view of an illumination box in accordance with a preferred embodiment to the present invention.

FIG. 1 represents a simplified perspective view of an illumination box 1 in accordance with a preferred embodiment to the present invention.

This kind of box can have multiple uses. In fact, not only may it be intended for shooting using a still camera (possibly that of a smartphone or a tablet) or a video camera of an object of limited size, by way of non-limiting illustrative example a watch or a piece of jewellery, avoiding transporting the object to be examined to a professional photographic studio where, in particular, setting up lighting appropriate to a particular object may be complicated. Of course, although the quality of illumination of the object to be examined will not be exactly the same as in a real photographic studio, it will approximate that as closely as possible. Moreover, this kind of illumination box can equally be used to show an object to a remotely located person by transmission of images from a video camera over an Internet connection.

As will emerge from the following description, the box 1 in accordance with the present invention lends itself perfectly to these various uses.

It is clear from FIG. 1 that the illumination box 1 includes a bottom 2 covered by a cover 4 itself surmounted by a shell 6. The distance between the cover 4 and the shell 6 is sufficient to define a space in which light sources 8 are arranged, the latter being depicted in FIG. 1 by way of non-limiting example in the form of strips of LEDs.

The bottom 2 and the cover 4 together form an envelope delimiting a housing 10 in which an object to be examined can be positioned, in particular an object to be shot by means of a still camera or a video camera.

The cover 4 is therefore made of a material allowing a great portion of the light emitted by the light sources 8 to pass through it and having at least one internal surface diffusing light toward the interior of the housing 10. By way of non-limiting example the cover 4 may be made of PMMA (Plexiglas) at least one internal face of which is frosted or sanded. The person skilled in the art may choose any other appropriate material without departing from the scope of the invention.

The cover 4 advantageously serves as a light guide: the light emitted by the light sources 8 that enters the cover 4 propagates throughout it to emerge in a substantially uniform manner into the housing 10 by virtue of being diffused.

In accordance with the preferred embodiment that is depicted in FIG. 1, the cover 4 of the box 1 comprises first and second lateral openings 12 each defining a passage through the cover 4 enabling a user to introduce the object to be examined into the housing 10, to extract it therefrom and to manipulate it therein. It is possible optionally to provide removable portions (not represented) with shapes complementary to those of the openings 12 so as to be able to block the latter when necessary. Thus each removable portion serves as a door enabling the object to be examined to be enclosed completely in the housing 10.

Each removable portion may be made of a material optically compatible with that of the rest of the cover 4 (that is to say here having a similar or even identical refractive index), preferably the same material, and may have substantially the same thickness as the rest of the cover 4. When the removable portions are positioned in the openings 12, corresponding to a closed configuration of the cover 4, they therefore define an internal surface continuous with the rest of the cover 4, while light passing through the rest of the cover 4 can be transmitted to the interior of the removable portions and vice-versa. Thanks to these features, the illumination box 1 may include one or more access doors to its housing 10 without this causing dark zones, as is the case with prior art devices.

The removable portions may be held in place in the openings 12 by any appropriate means without departing from the scope of the present invention, in particular by hinges positioned on the outside of the envelope or by employing at least one tongue or an appropriate rim formed on the exterior periphery of the removable portion intended to bear on the external surface of the cover 4 around the openings 12.

The bottom 2 is advantageously also made of a material optically compatible with that of the cover 4, preferably the same material. Thus the interface between the bottom 2 and the cover 4 allows light to pass freely from the one to the other and allows the bottom 2 to contribute to the illumination of the housing 10. Generally speaking, this feature also enables the use of backlighting, if necessary, by disposing at least one light source under the bottom 2. More generally, the bottom 2 has an internal surface adapted to allow diffusion of light to the interior of the housing 10.

Moreover, there may advantageously be provision for the shell 6 to be made of an opaque material, not only for the comfort of the user, avoiding dazzling them, but also to retain maximum light inside the illumination box 1.

Figure 2:
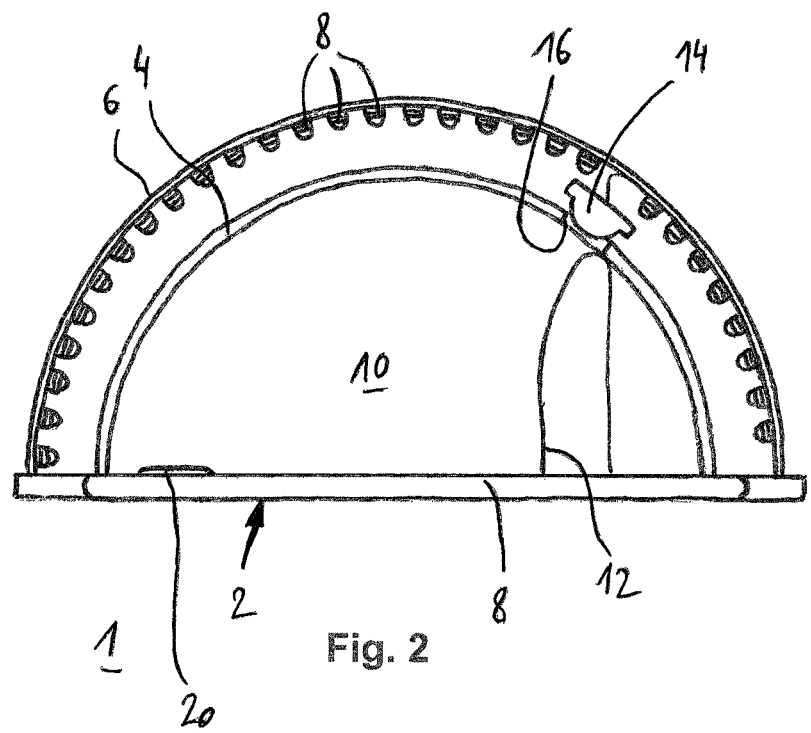
FIG. 2 represents a simplified lateral view of a part of the illumination box from FIG. 1.
Figure 3:
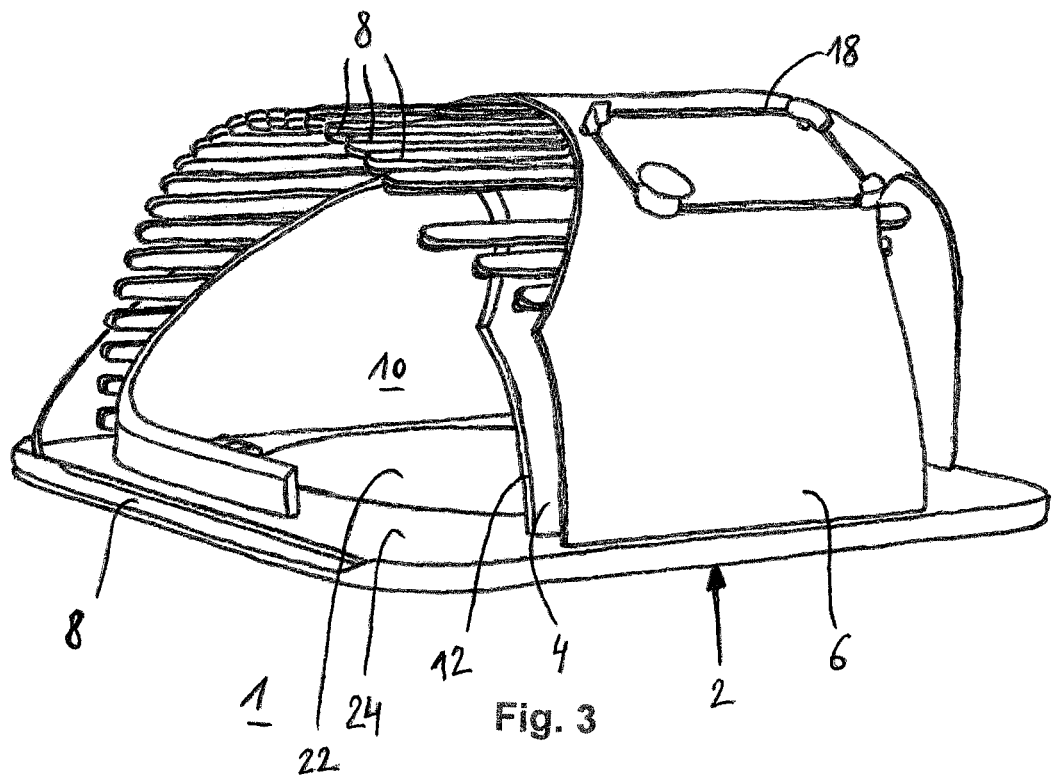
FIG. 3 represents a simplified perspective view of the illumination box from FIG. 1 in which a part of the box has been removed to expose certain construction details.

FIGS. 2 and 3 respectively represent simplified partial lateral and perspective views of the illumination box 1, enabling certain details of construction to be better understood.

It is seen in the views of FIGS. 2 and 3 that the light sources 8 are regularly distributed all around the cover 4 to guarantee the uniformity of the illumination in the housing 10.

Moreover, it is seen from these same figures that a light source 8 is also arranged against an edge surface of the bottom 2 in order for the latter to be able to contribute actively to the illumination of the housing 10. As mentioned above, at least one light source 8 may be arranged under the bottom (not depicted) to enable the use of backlighting of the object to be examined.

The person skilled in the art will encounter no particular difficulty in arranging light sources 8 around the bottom 2 in a manner appropriate to their particular needs. Thus it is for example possible to locate a light source 8 on at least each of the shorter sides of the bottom 2 or on at least each of its longer sides and/or under the bottom 2, even to use a single flexible strip of LEDs and arrange it all around the bottom 2.

Thanks to this feature the bottom 2 actively transmits light into the housing 10, which also makes it possible to mask completely the junctions between the bottom 2 and the cover 4 to the extent that the latter also emit light, like all the rest of the envelope.

The entirety of the envelope therefore behaves here as a light guide over its entire extent, that is to say at the level of the cover 4, of the bottom 2 and of the interface between these two elements, resulting in continuous and uniform illumination of much better quality than with prior art devices.

It will be noted that in the context of the application aiming to display an object to a remotely located person using the box 1, preferably by video, the quality of the illumination employed in the housing 10 is less critical than for taking photographs of that object with a quality approaching that of a professional studio.

It will moreover be noted that here the cover 4 advantageously has a curved general shape with no sharp edges to enable maximum optimization of the uniformity of the illumination in the housing 10.

Where placing the device for shooting is concerned, a plurality of solutions may be envisaged whilst remaining within the scope of the present invention. It is possible to arrange a video camera 14 in the space located between the cover 4 and the shell 6 (FIGS. 1 and 2) or, alternatively, a video camera, a still camera, a smartphone or a tablet may be placed outside the shell 6.

The cover 4 therefore includes a hole 16 enabling shooting from outside the envelope delimiting the housing 10.

When a device has to be arranged outside the shell 6, the latter is equally provided with a window (not visible) located substantially in line with the hole 16 in the cover 4.

If an external device is used an appropriate support 18 may be provided on the shell 6, as depicted in FIG. 3, here consisting of a smartphone support.

Moreover, there may be provision for the illumination box 1 to include a device 20 for controlling the light sources 8 arranged in the housing 10, possibly even a removable device, in an analogous manner to a remote control. Thus this device 20 can in particular make it possible to adjust the properties of the light emitted by the light sources 8, such as its intensity and/or its temperature, for example. As already mentioned, the light sources 8 may preferably be controlled individually and/or in groups associated with different zones of the envelope, in particular their power.

Moreover, it is possible to provide for the control device 20 also to enable remote control of an imaging device, such as a still camera, a video camera, a smartphone or a tablet. Alternatively, it is possible to provide for the use of an additional control device specific to the imaging device.

An optional additional feature may advantageously be employed in the housing 10, namely providing a turntable 22 located substantially at the centre of the housing 10. To this end the bottom 2 may comprise a peripheral portion 24 fixed relative to the cover 4 and including a circular hole in which is arranged a disc-shaped central portion defining the turntable 22. Various mechanisms for driving the turntable 22 in rotation may be provided whilst remaining within the scope of the present invention. There may advantageously be provision for a transparent plate (not visible) located outside the housing 10 to be fastened to the turntable 22. This transparent plate could therefore be manipulated by a user from outside the housing to cause the turntable 22 to turn and thus the object to be examined to turn, without this creating any dark zone under the turntable 22.

Figure 4:
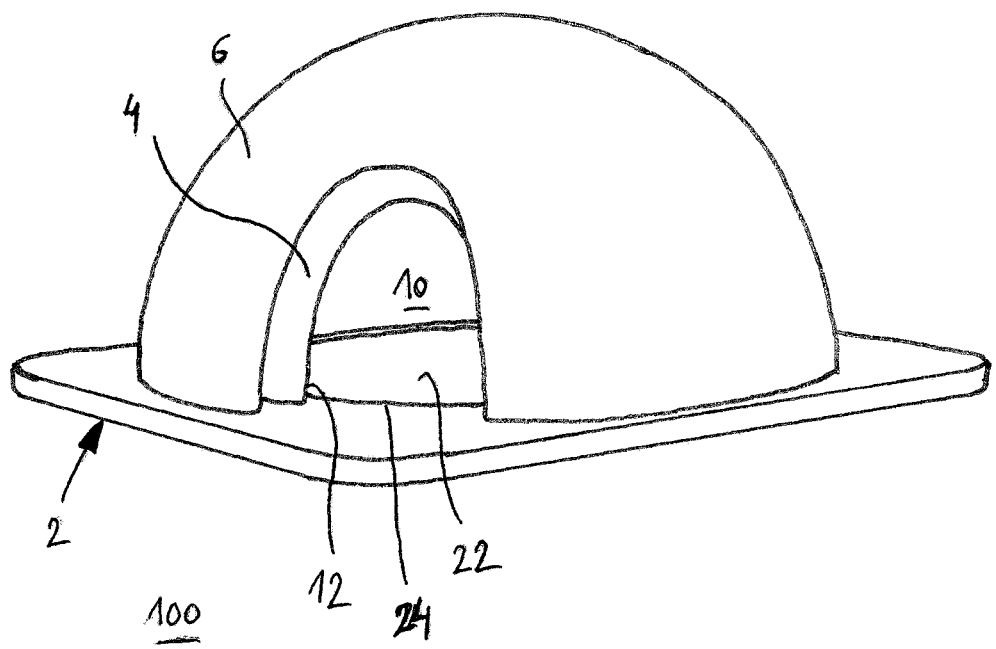
FIG. 4 represents a simplified perspective view of an illumination box in accordance with a variant embodiment of the present invention.
Figure 5:
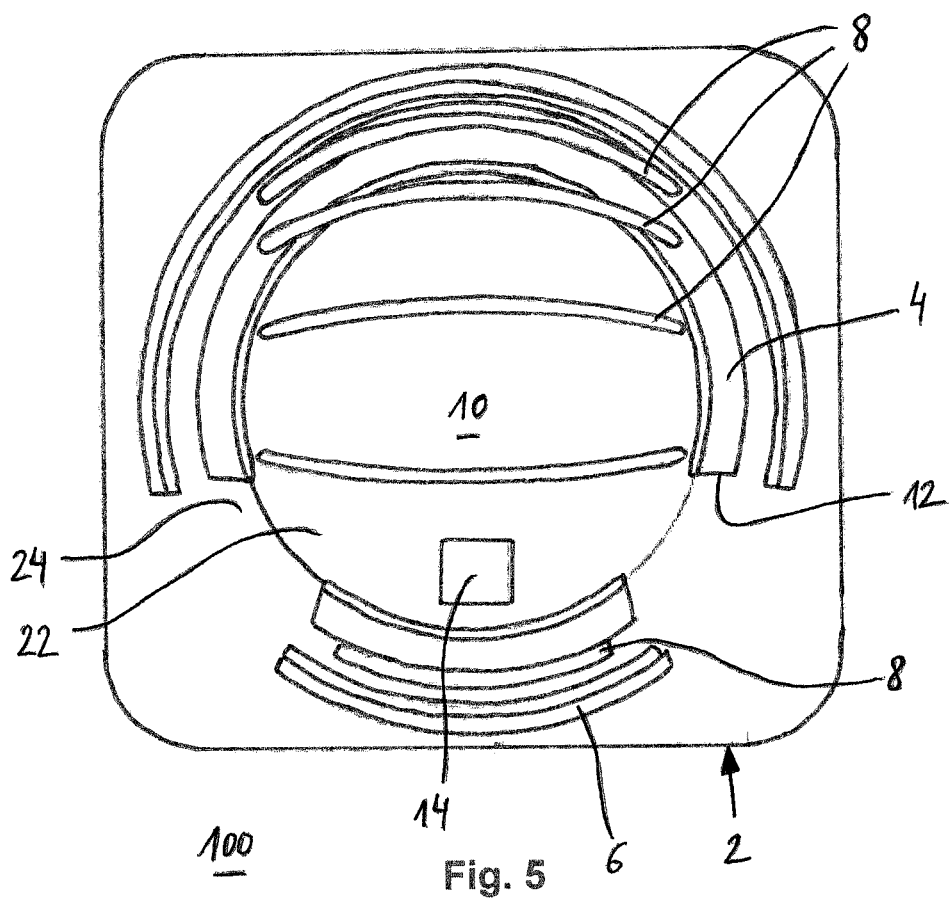
FIG. 5 represents a simplified view from above of a part of the illumination box from FIG. 4.
Figure 6:
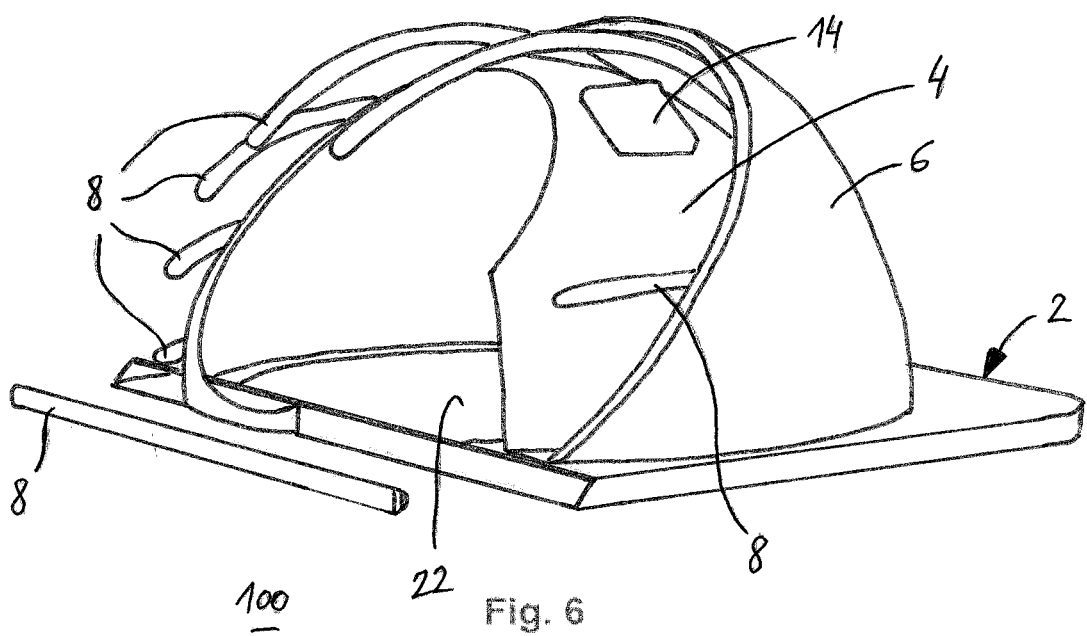
FIG. 6 represents a simplified perspective view of the illumination box from FIG. 4 in which a part of the box has been removed to expose certain construction details.

FIGS. 4, 5 and 6 represent respective simplified views in perspective, partially from above and in perspective with partial masking of an illumination box 100 in accordance with a variant of the preferred embodiment of the present invention.

For simplicity the same components as those described with reference to FIGS. 1 to 3 bear the same reference numbers.

The illumination box 100 is simply distinguished from the illumination box 1 by its domed general shape.

The illumination box 100 is shown in FIGS. 4 to 6 in a variant comprising an internal video camera 14 arranged in the space between the cover 4 and the shell 6.

It is seen that flexible light sources 8 are used so that they are able to follow as closely as possible the curvature of the cover 4.

This domed shape in particular enables the production of an illumination box more compact than that depicted in FIGS. 1 to 3.

Figure 7:
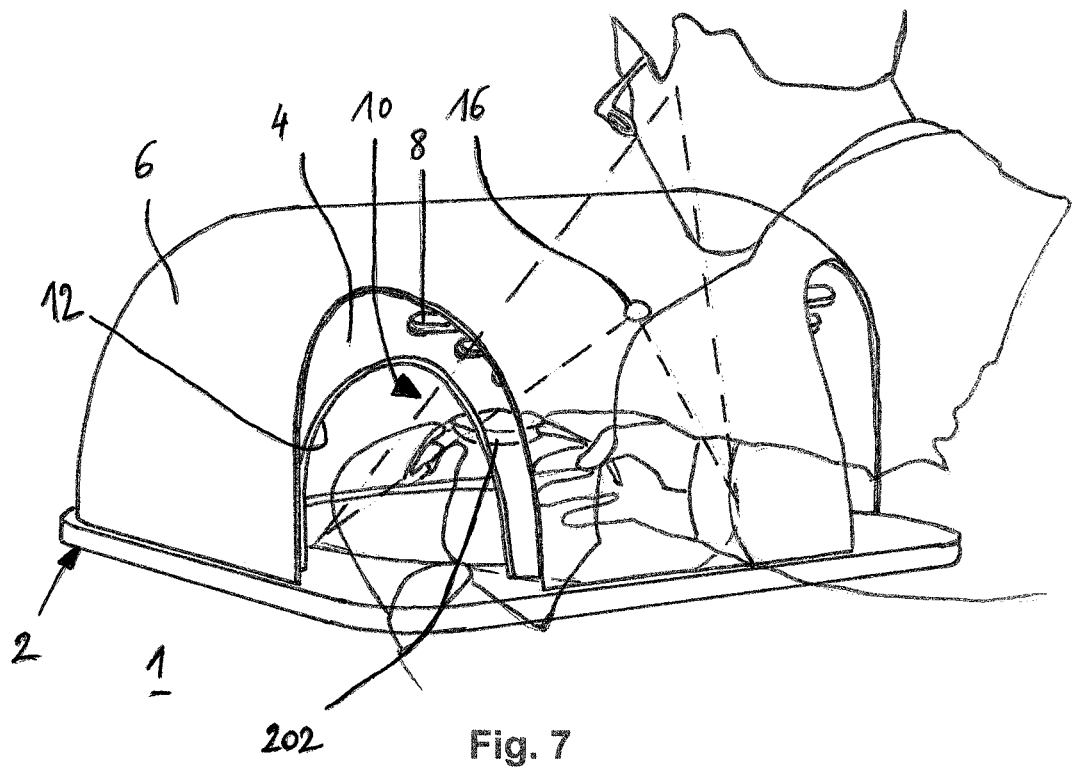
Figure 8:
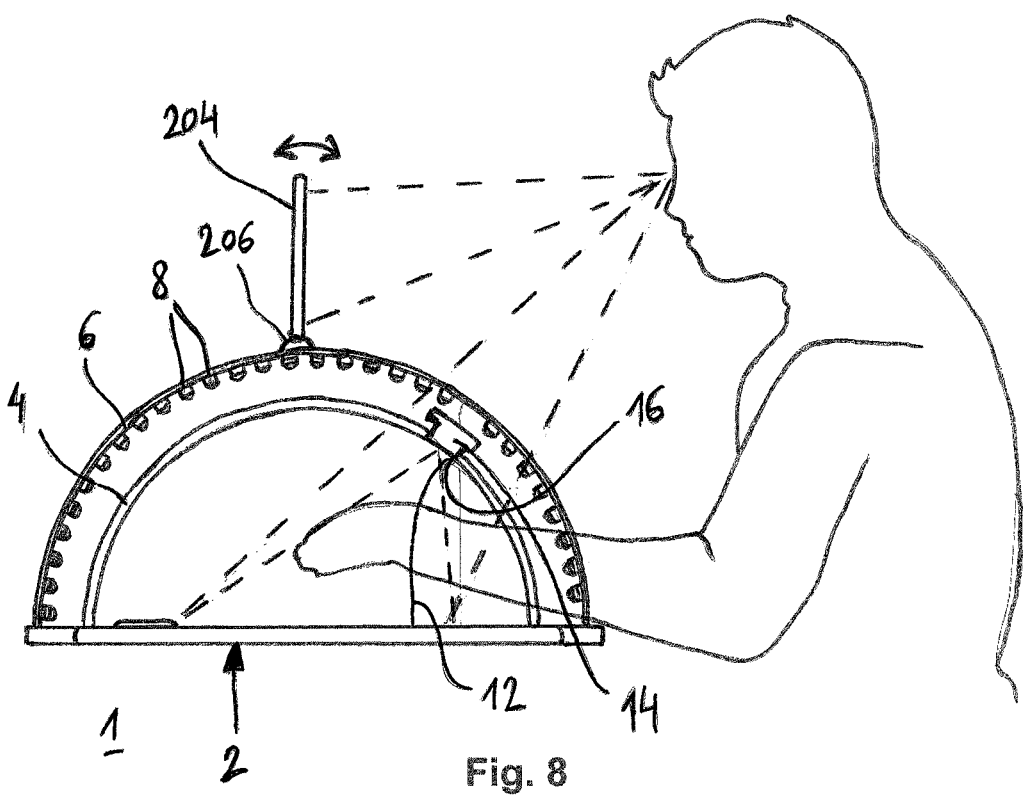
Figure 9:
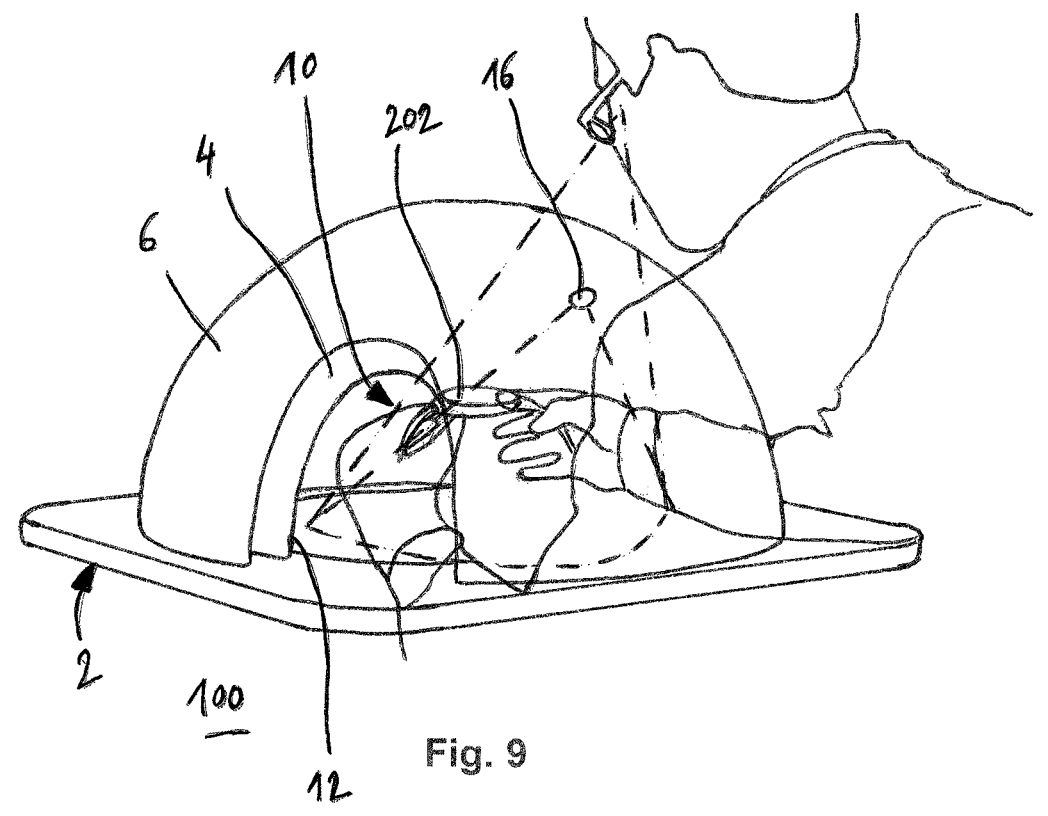

FIGS. 7, 8 and 9 represent views respectively similar to those of FIGS. 1, 2 and 4 in which an operator has been schematically depicted to better highlight the advantages of the box according to the invention.

To be more precise, the operator is represented in the service position or the position of using the box 1 or 100, that is to say facing the box 1, 100, either seated or standing, and having the first and second openings 12 oriented toward them and situated substantially symmetrically relative to a transverse plane passing through the centre of the box 1, 100 and between their eyes. Thus access to the housing 10 is effected symmetrically via the two openings 12, the operator being in a position to place their two hands in the central region of the housing 10 in a posture that is comfortable for them, which facilitates the manipulation of the object in the housing. This latter point is more particularly clear in the FIGS. 7 and 9 views in which an object 202 taking the form of a wristwatch is depicted.

Of course, the nature of this particular application has a direct impact on the dimensions of the box 1, 100 and more particularly on the distance between the two openings 12 (when there are two of them). In fact, the distance between the two openings 12 should preferably be between approximately 30 and 60 cm inclusive to guarantee a comfortable posture for the operator during use. Consequently, even though it is possible to produce a box 1 of greater length without this departing from the scope of the invention as defined by the claims there is no great benefit in its length exceeding 80 cm.

It is apparent from the FIGS. 7, 8 and 9 views that, in the service position, the lens of the still camera or of the video camera used (therefore that of the video camera 14 or the hole 16) is situated substantially between the eyes of the operator and the housing 10.

As mentioned above, the relative position of the lens of the still camera or the video camera and the eyes of the operator enables images to be captured of the object 202 to be examined substantially corresponding to a direct view. The operator can therefore manipulate the object 202 in the box 1, 100, in particular to change its orientation, with a sensation very close to that of a manipulation of that object 202 outside the box 1, 100 with a direct view of it. Similarly, a remotely located interlocutor to whom the object 202 would be displayed using the box 1, 100 according to the invention could view that object 202 in a very faithful manner, that is to say virtually having the impression of having the object 202 in their hands.

An optional tablet 204 has moreover been represented by way of non-limiting illustration in the FIG. 8 view.

Here the tablet 204 is mounted on the protective shell 6 by means of an appropriate support 206, preferably in such a manner as to be able to pivot between an active, deployed position (as illustrated in FIG. 8), and an inactive position, folded against the shell 6.

The tablet 204 advantageously comprises a screen for viewing images captured by the still camera or the video camera, which is more particularly of benefit when a video camera 14 is arranged directly between the shell 6 and the cover 4. The operator can therefore control directly which image the system transmits to the remotely located interlocutor without even moving their head.

Various options can be envisaged without departing from the scope of the invention as defined by the claims, in particular the fact that the tablet 204 can be provided with at least one additional video camera to enable video conferencing between the operator and the remotely located interlocutor, or even to enable shooting outside the box 1, 100, for example to transmit images of a necklace being worn. The tablet 204 may equally be provided with dedicated lighting, such as a flash or one or more LEDs to illuminate a scene outside the box 1, 100.

Generally speaking, the box includes an electronic connection device to enable the transmission of captured images to a remotely-located interlocutor, possibly via the tablet 204 when there is one, the latter then including at least one device for connection to a communication network (GSM, WiFi or Bluetooth type data). The person skilled in the art will encounter no particular difficulty in using electronic components enabling the remote connection to be set up between the box 1, 100 and the remotely-located interlocutor, the nature of which does not impact directly on the execution of the present invention.

The person skilled in the art will encounter no particular difficulty in adapting the present teaching to produce an illumination box having a shape different from those shown here by way of non-limiting illustration without departing from the scope of the invention as defined in the appended set of claims. Moreover, it is possible to provide many different arrangements of the light sources without departing from the scope of the invention, in particular to take the shape of the envelope into account. Moreover, it is equally possible to provide for the arrangement of at least one light source under the bottom of the box to provide backlighting of the object to be examined, if necessary.

Thanks to the features that have just been described it is possible to produce an illumination box for the remote display of an object with excellent visibility and fidelity.

The foregoing description is devoted to describing one particular embodiment by way of non-limiting illustration and the invention is not limited to the use of certain particular features that have just been described, such as for example the shape of the illumination box depicted and described, or again the material from which its various components are made or the nature of the light sources used.

The invention claimed is:

1. A box for remote display of an object by a still camera or a video camera, the box comprising:
   an envelope defining a substantially closed housing for an object to be examined and comprising a bottom and a cover; and
   an illumination system comprising a plurality of light sources located around said envelope,
   wherein said cover is made of a material reflecting at least some of the light emitted by said light sources toward an interior of said housing and having an internal surface configured to diffuse the light transmitted to the interior of said housing, said cover comprising
      a hole configured to be obstructed by a lens of the still camera or the video camera located outside said envelope to shoot the object, and
      at least one first opening, at a distance from said hole and defining a passage through said cover, to enable an operator to introduce the object to be examined into said housing, to extract the object therefrom and to manipulate the object therein,
   wherein said bottom is made of a material reflecting at least some of the light emitted by said light sources toward the interior of said housing and having an internal surface configured to diffuse the light transmitted to the interior of said housing,
   wherein said envelope serves as a light guide over the entirety of the extent of the envelope to produce substantially homogeneous illumination of said housing,
   wherein the box is configured such that, in a service position, in which the operator faces the box, the first opening is configured to receive an arm of the operator inserted therethrough and the housing is configured to receive a hand of the operator substantially at the center thereof.

2. The box as claimed in claim 1, further comprising a protective shell disposed around said cover at a sufficient distance therefrom to define a space in which at least some of said light sources and the video camera are disposed.

3. The box as claimed in claim 2, further comprising a screen configured to display images captured by said still camera or said video camera disposed on said protective shell.

4. The box as claimed in claim 3, wherein said display screen is the screen of a tablet fastened to said protective shell by an appropriate support.

5. The box as claimed in claim 4, wherein said tablet comprises at least one additional video camera to enable a videoconference to be held between the operator and a remotely-located interlocutor.

6. The box as claimed in claim 5, further comprising an electronic connection device configured to enable transmission of the images of the object captured by said still camera or said video camera to a remotely-located interlocutor,
   wherein said electronic connection device is configured to transmit images of the object to said tablet, the tablet including a device configured to connect the tablet to a communication network.

7. The box as claimed in claim 4, wherein said appropriate support is configured to allow pivoting of said tablet relative to said protective shell between an active, deployed position and an inactive position folded towards said protective shell.

8. The box as claimed in claim 1, wherein said cover further comprises at least one second opening defining an additional passage through said cover configured to enable the operator to introduce the object to be examined into said housing, to extract the object therefrom and to manipulate the object therein, and
   wherein said at least one first opening and the at least one second opening are positioned relative to one other and configured to receive both arms of the operator so that the object to be examined is able to be manipulated in the service position.

9. The box as claimed in claim 8, wherein said hole and said first and second openings are disposed on the same side of a transverse plane substantially perpendicular to said bottom and containing the center of the box.

10. The box as claimed in claim 9, wherein said cover has a curved general shape with no sharp edges.

11. The box as claimed in claim 8, wherein said cover has a curved general shape with no sharp edges.

12. The box as claimed in claim 8, further comprising a protective shell disposed around said cover at a sufficient distance therefrom to define a space in which at least some of said light sources and the video camera are disposed.

13. The box as claimed in claim 1, further comprising a protective shell disposed around said cover at a sufficient distance therefrom to define a space in which at least some of said light sources are disposed, said shell featuring a window substantially aligned with said hole in said cover.

14. The box as claimed in claim 13, wherein said shell carries a support for the still camera, a smartphone, a tablet or the video camera.

15. The box as claimed in claim 1, further comprising a controller configured to control said light sources to enable adjustment of the properties of the light emitted thereby.

16. The box of claim 15, wherein the properties comprise at least one of intensity and temperature.

17. The box as claimed in claim 1, further comprising a remote-control device for a still camera, a smartphone, a tablet or a video camera.

18. The box of claim 17, wherein the remote-control device is configured to allow triggering shooting.

19. The box as claimed in claim 1, wherein said cover has a curved general shape with no sharp edges.

20. The box as claimed in claim 1, further comprising an electronic connection device configured to enable transmission of the images of the object captured by said still camera or said video camera to a remotely-located interlocutor.

* * * * *